April 18, 1961  K. W. COCHRAN  2,980,850
ELECTRO-MAGNETIC PIPE INSPECTING APPARATUS
Filed April 30, 1958  5 Sheets-Sheet 4

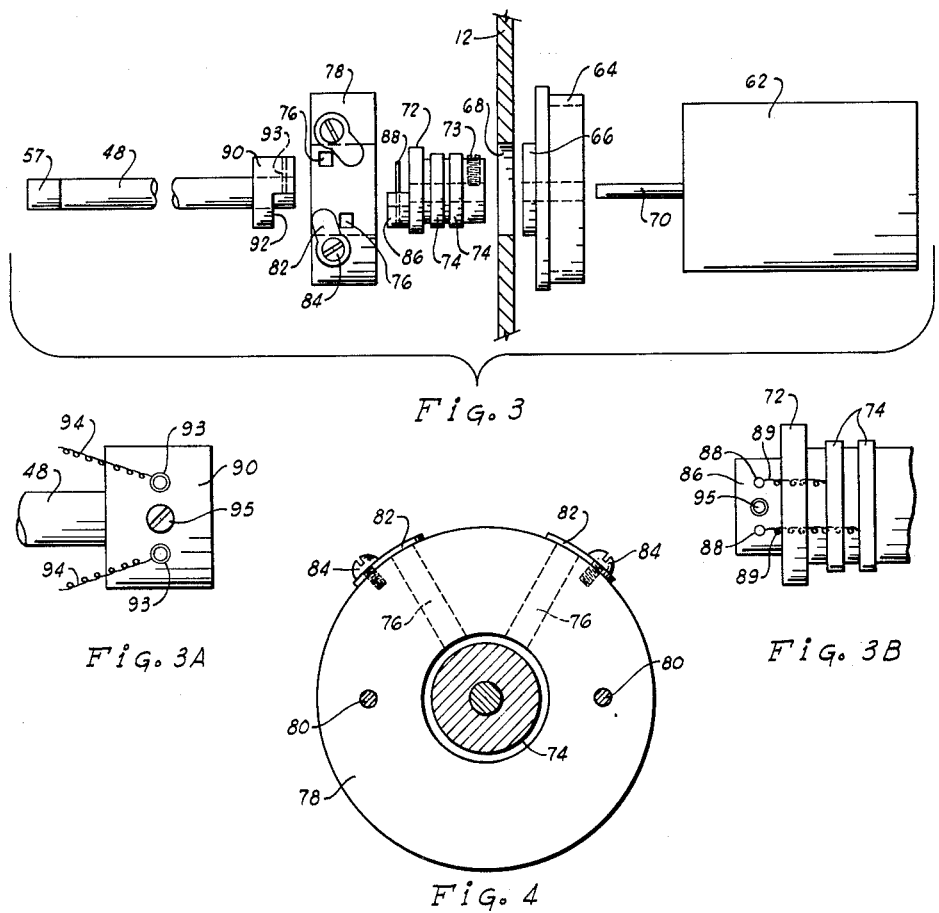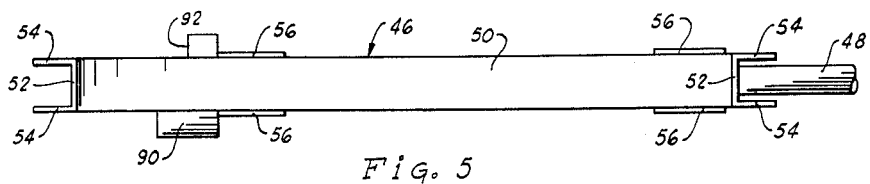

INVENTOR.
KENNETH W. COCHRAN
BY
ATTORNEY

April 18, 1961 K. W. COCHRAN 2,980,850
ELECTRO-MAGNETIC PIPE INSPECTING APPARATUS
Filed April 30, 1958 5 Sheets-Sheet 5
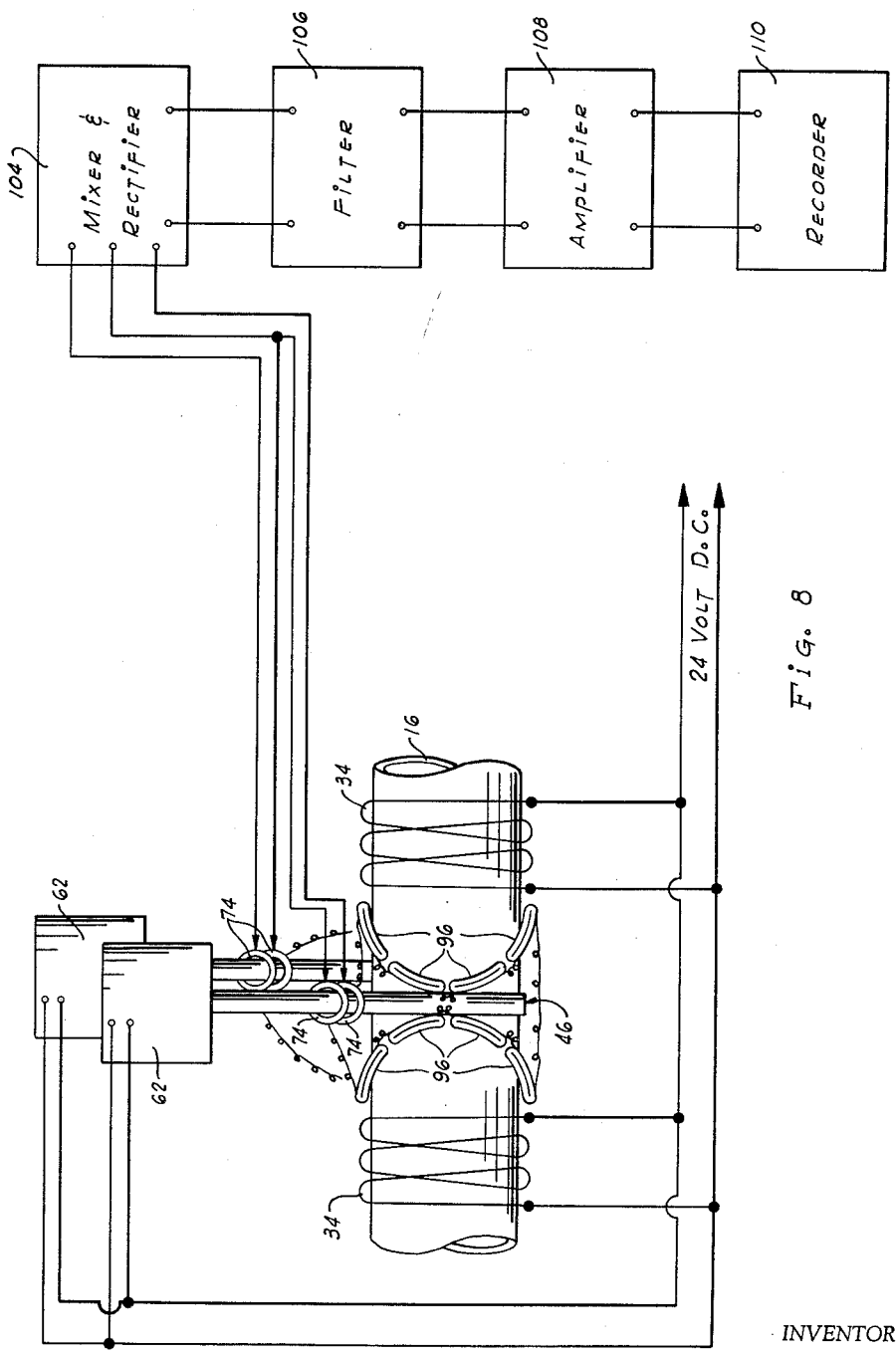
INVENTOR.
KENNETH W. COCHRAN
BY
*Jerry J Dunlap*
ATTORNEY

United States Patent Office 2,980,850
Patented Apr. 18, 1961

2,980,850
ELECTRO-MAGNETIC PIPE INSPECTING APPARATUS

Kenneth W. Cochran, Oklahoma City, Okla., assignor of one-half to Tubular Inspection Co., Inc., Oklahoma City, Okla., a corporation of Oklahoma, and one-half to Russell C. Heldenbrand, doing business as Heldenbrand Tubular Service, New Iberia, La.

Filed Apr. 30, 1958, Ser. No. 731,971

7 Claims. (Cl. 324—37)

This invention relates generally to improvements in apparatus for locating inhomogeneities in magnetized ferromagnetic specimens, and more particularly, but not by way of limitation, to an improved apparatus for locating flaws in ferromagnetic pipe.

As it is well known in the art, the magnetic field of a uniformly saturated ferromagnetic specimen will be consistent, with the flux density gradient being less at the center of the specimen and progressively becoming more strong at the ends or the poles of the specimen in its normal state. However, if the specimen has been subjected to a change of its molecular structure, the uniform field will be distorted and the magnetic lines of force will no longer be consistent, but will vary in accordance with the condition at the point of departure from the normal state of the specimen. The changes in molecular structure may be due to numerous conditions, such as metal parting, loss of metal, or a stress of the metal beyond its elastic limit. When the specimen is a pipe, the change in molecular structure may be due to a crack in the pipe, pitting or corrosion of the pipe, or bending or cold working of the pipe.

Various types of pipe inspecting devices which rely upon the variation of the magnetic field of a pipe have been devised. Heretofore, however, such devices have used one or more pick-up coils constructed in such a manner as to slide along the pipe and provide an induction of current in the coils, particularly where the magnetic field surrounding the pipe varies. In some cases, the inherent magnetism present in a ferromagnetic pipe which has been used is relied upon to furnish the magnetic field. However, the majority of prior devices include a magnetizing coil which is moved along the pipe with the pick-up coils, either ahead of or behind the pick-up coils, to increase the magnetism of the pipe in the area of the pick-up coils. The current induced in the pick-up coils is amplified and fed to a recorder which provides a log of the variation in the magnetic field around the pipe, wherein the log may be correlated with the length of the pipe to locate flaws in the pipe. Such recorders are of the pen type and necessarily have a substantial time delay between the reception of a signal by the recorder and the movement of the pin. As a result, the pick-up coils must be moved slowly along the pipe, yet the slower the speed of movement of the pick-up coils, the less will be the magnitude of the current generated in the coils in passing through the magnetic field. As a result, the pick-up coils must be moved along the pipe at a rather precise speed for each inspecting operation. Many present day devices include a mechanical or electrical drive system, as contrasted with manually moving the device along a pipe, in order to more precisely control the speed the device is moved along the pipe.

The present invention contemplates a novel apparatus for examining a pipe by also utilizing the variations in the magnetic field surrounding a magnetized ferromagnetic pipe to locate inhomogeneities, hereinafter referred to as flaws, in the pipe. I prefer to use two magnetizing coils in straddling relation with respect to the pick-up coils; that is, a magnetizing coil preceding the pick-up coils and a magnetizing coil following the pick-up coils, with the two magnetizing coils being connected with their magnetic polarities in opposition. The use of two magnetizing coils assures that the portion of the pipe opposite the pick-up coils will be completely saturated, and enhances the variation in the magnetic field surrounding the pipe when a flaw is encountered. I also contemplate the use of pick-up coils rotating about axes transverse to the longitudinal axis of the pipe and the path of movement of the apparatus along the pipe, such that the coils will cut a substantially larger number of lines of force for each unit length of the pipe along which the apparatus is moved.

In the preferred embodiment of this invention, paddle like members are rotatably supported transversely with respect to the pipe, above and below the pipe, and each paddle member carries a plurality of pick-up coils. During rotation of the paddle members, each coil is alternately moved toward and away from the pipe to move the coil through the maximum number of lines of force in the magnetic field surrounding the pipe. Furthermore, the paddle members are provided with concave-shaped sides, and the coils are curved and arrange in these concave sides, such that each paddle will encircle about one-half the periphery of the pipe twice during each revolution of the paddle, and the pick-up coils will effectively scan the entire periphery of the pipe. The present apparatus may be moved along the pipe at any desired speed, since the pick-up coils are moving at a substantially greater speed than the remainder of the apparatus and will produce distinct signals of substantial magnitude when passing flaws in the pipe, such that the resulting log may be easily correlated with the length of the pipe.

An important object of this invention is to provide a pipe inspecting device of the electro-magnetic type which will locate any appreciable variation in the molecular structure of the pipe.

Another object of this invention is to reduce the time required in correlating the log of an electro-magnetic type inspection device with the pipe, and the time involved in locating flaws in a pipe.

Another object of this invention is to provide a complete magnetic saturation of a pipe in the area of the pick-up coils of an electro-magnetic pipe inspecting device, to magnify the variations in the magnetic field surrounding the pipe which are caused by variations in the molecular structure of the pipe.

A further object of this invention is to provide an electro-magnetic type pipe inspecting device wherein the pick-up coils of the device will cut the maximum number of lines of force in the magnetic field surrounding a pipe.

Another object of this invention is to provide a pipe inspecting device utilizing rotating pick-up coils arranged to indicate any variation in the magnetic field surrounding a pipe.

Another object of this invention is to provide an electro-magnetic pipe inspecting device which may be moved manually along a pipe and still produce a log which may be easily correlated with the pipe.

A still further object of this invention is to provide a novel pick-up coil construction for electro-magnetic pipe inspecting devices.

Another object of this invention is to provide an electro-magnetic pipe inspecting device which is simple in construction, may be easily converted for use on various sizes of pipe, will have a long service life, and may be economically manufactured.

Other objects and advantages of the invention will be evident from the following detailed description, when read in conjunction with the accompanying drawings which illustrate my invention.

In the drawings:

Fig. 3 is an exploded view illustrating the connection of the paddles to their respective driving motors.

Figure 3A is an enlarged elevational view of the inner head shown in Fig. 3 as viewed by turning the head 90 degrees clockwise from the position shown in Fig. 3.

Figure 3B is an enlarged elevational view of the outer head shown in Fig. 3 as viewed by turning the head 90 degrees counterclockwise from the position shown in Fig. 3.

Figure 4 is an elevational view of a typical slip-ring and brush assembly for transmitting current from the pick-up coils.

Figure 5 is a typical plan view of one of the paddles, with the pick-up coils removed.

Figure 8 is a schematic wiring diagram of the magnetizing coils, pick-up coils and recording circuit.

Figure 1:
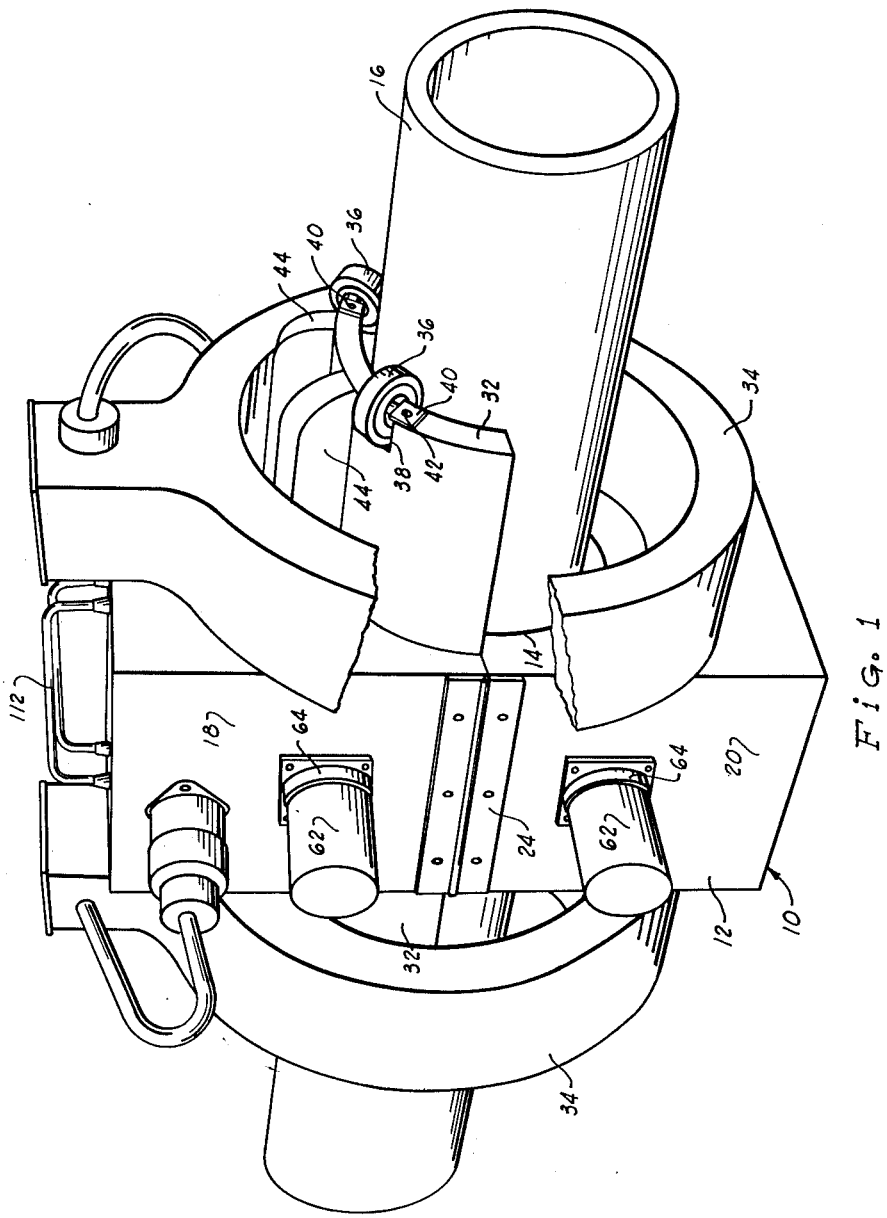
Figure 1 is a perspective view of an electro-magnetic pipe inspecting apparatus constructed in accordance with this invention.

Referring to the drawings in detail, and particularly Fig. 1, reference character 10 generally designates a preferred form of my invention, which includes a rectangularly shaped hollow housing 12 having an aperture 14 (see also Fig. 2) in each end thereof of a size to loosely receive the pipe 16 being inspected. The housing 12 is constructed in an upper section 18 and a lower section 20 which meet at approximately the centers of the apertures 14, such that one-half of each aperture 14 is formed in the upper section 18 and the remaining half is formed in the lower section 20. The two sections 18 and 20 are interconnected by a suitable hinge 24 at one side thereof to permit assembly of the housing 12 over a medial portion of the pipe 16. At the opposite side of the housing 12, a suitable spring-loaded fastener 26 is secured to the upper end of the lower housing section 20 by a nut and bolt 28. The fastener 26 engages a clip 30 secured on the lower end of the upper housing section 18 to hold the housing 12 in assembly around the pipe 16 to be inspected.

A support arm 32 (Fig. 1) extends outwardly from each end of the housing 12 over the respective aperture 14 to support a magnetizing coil 34 substantially concentrically around the pipe 16 being inspected. Each arm 32 is secured to the upper section 18 of the housing 12 and is curved transversely to extend substantially concentrically around the upper half of the respective aperture 14. A pair of circumferentially spaced rollers 36 are secured in the outer end of each arm 32 to support the apparatus 10 on the pipe 16, such that the apparatus 10 may be moved lengthwise along the pipe 16. Each roller 36 extends into a slot 38 in the respective end of the arm 32 and is secured to the arm 32 by suitable brackets 40 and bolts 42. Each arm 32 preferably has several radially spaced bolt holes (not shown) to receive each of the bolts 42, whereby the rollers 36 may be adjusted radially with respect to the apertures 14 and support the housing 12 substantially concentrically around various sizes of pipes 16. It will be apparent that when larger pipe are inspected, the rollers 36 must be moved radially outward to retain the housing 12 substantially concentrically around the larger pipe.

Each magnetizing coil 34 is, of course, covered with suitable insulating material and is supported on the respective arm 32 by a pair of circumferentially spaced bars 44 extending upwardly from the arm to retain the magnetizing coil substantially concentric with respect to the apertures 14. The magnetizing coils 34 are also connected in opposing magnetizing senses, as will be more fully hereinafter set forth.

A paddle-shaped member, generally designated by reference character 46 (see Fig. 2), is rotatably secured in each of the upper and lower housing sections 18 and 20 and extends transversely to the axis of the apertures 14, and hence the axis of the pipe 16 to be inspected, as well as the path of movement of the apparatus 10. Each paddle-shaped member 46 comprises a shaft 48 of non-magnetic material having two coil holders 50 secured on opposite sides of the shaft. Each coil holder 50 is curved lengthwise on the arc of a circle having a radius slightly larger than the outer radius of the pipe 16 being inspected, such that each holder 50 will partially encircle the pipe 16 once during each revolution of the respective paddle 46. It will also be observed that each holder 50 is of a length to encircle about one-half the periphery of the pipe 16. Each holder 50 is channel-shaped in cross-section, as illustrated in Fig. 5, with the base 52 of the channel forming the portion of the respective holder which is exposed to, and brought nearest to, the pipe 16 being inspected. The flanges 54 of each holder 50 are provided to retain a series of pick-up coils in the respective holder, as will be more fully hereinafter set forth. The coil holders 50 are, of course, made out of a non-magnetic material to provide no interference with magnetic lines of force surrounding the pipe 16.

As previously indicated, each pair of coil holders 50 are mounted on opposite sides of the respective shaft 48. The center portion of each coil holder 50 is preferably welded or brazed to the central portion of the shaft 48, and bracing plates 56 extend transversely across the opposite sides of the shaft 48 into connection with intermediate portions of the holders 50. The plates 56 may also be welded or brazed to the shaft 48 if desired. It will thus be observed that each member 46 is substantially paddle-shaped, with the opposite side edges of the member being concaved on the arc of a circle slightly larger than the pipe 16 being inspected. Also, each coil holder 50 forms a concave-shaped groove or slot in the respective paddle member to receive a series of pick-up coils.

One end of each shaft 48 (Fig. 2) is provided with a cylindrical extension 57 of a bearing type material secured to the shaft 48 in any desired manner. The extension 57 slidingly fits in an apertured spherically shaped bearing 58. The bearing 58 is in turn journaled in a curved-wall aperture 59 in the respective side wall of the housing 12 and a cap 60 forming a socket for the bearing. Thus, the respective paddle member 46 may be tilted in the respective aperture 59 and cap 60, and removed from the bearing 59 and the housing 12 when the housing 12 is removed from around the pipe 16. This removable feature is very advantageous, since it is most desirable to use different sized paddle members 46 for different sized pipes 16 in order that the respective holders 50 will substantially encircle the pipe 16 and will be brought in close proximity with the outer periphery of the pipe 16 when the paddle members 46 are rotated. The opposite end of each shaft 48 is connected to a suitable motor 62, as shown most clearly in Fig. 3.

Each motor 62 is inserted in a tubular holder 64 which in turn is suitably bolted to the outer face of the respective side wall of the housing 12. Also, a circular extension 66 on the respective holder 64 fits tightly in an aperture 68 in the housing 12 to align the drive shaft 70 of the respective motor 62 on an axis with the respective paddle shaft 48. A tubular head 72 formed of a non-conductive material is telescoped over the inner end portion of the respective motor shaft 70 and is secured on the shaft 70 by a set screw 73 to provide rotation of the head 72 upon operation of the motor 62. The head 72 has a pair of slip rings 74 secured in axially spaced relation around the medial portion of the head to make contact with a pair of brushes 76 carried in a stationary ring 78, which ring is also formed out of a non-conductive material. The stationary ring 78 (see also Fig. 4) is secured to the inner face of the respective side wall of the housing 12 concentrically around the aperture 68 and around the head member 72. Bolts 80, as partially shown in Fig. 4, are used to secure the ring 78 to the side of the housing 12. Each of the brushes 76 extends through a radially extending bore in the ring 78 into contact with the outer surface of one of the slip rings 74. The brushes 76 are held in their operating positions by suitable clips 82 secured on the outer periphery of the ring 78 by screws 84. The clips 82 may be turned when the screws 84 are loosened to remove and replace the brushes 76. Also, the clips 82 and screws 84 provide electrical connectors for the brushes 76, as will be more fully hereinafter set forth.

The inner end of the head member 72 (Fig. 3) is provided with a semi-circular projection 86 thereon. A pair of plugs or pins 88 (see also Fig. 3B) extend transversely through the projection 86 on opposite sides of the center line of the head 72 and project beyond the flat side of the projection 86. The pins 88 are connected to the slip rings 74 by leads 89 extending through small bores in the head 72 as shown in Fig. 3B. Another non-conductive material head 90 is secured on the respective end of the paddle shaft 48 and is provided with a cutaway portion 92 conforming to the shape of the projection 86 on the head member 72. The head 90 has a pair of sleeves 93 therein arranged to form sockets for the pins 88 carried by the head 72. As shown in Fig. 3A, leads 94 extend from the sockets 93 for connection with the pick-up coils, as will be hereinafter set forth. The head 90 is secured to the head 72 by a screw 95 threaded through complementary bores in the heads 72 and 90 to provide rotation of the shaft 48 with operation of the motor 62. It is also preferred that the screw 95 extend through the end of the shaft 48.

Figure 2:
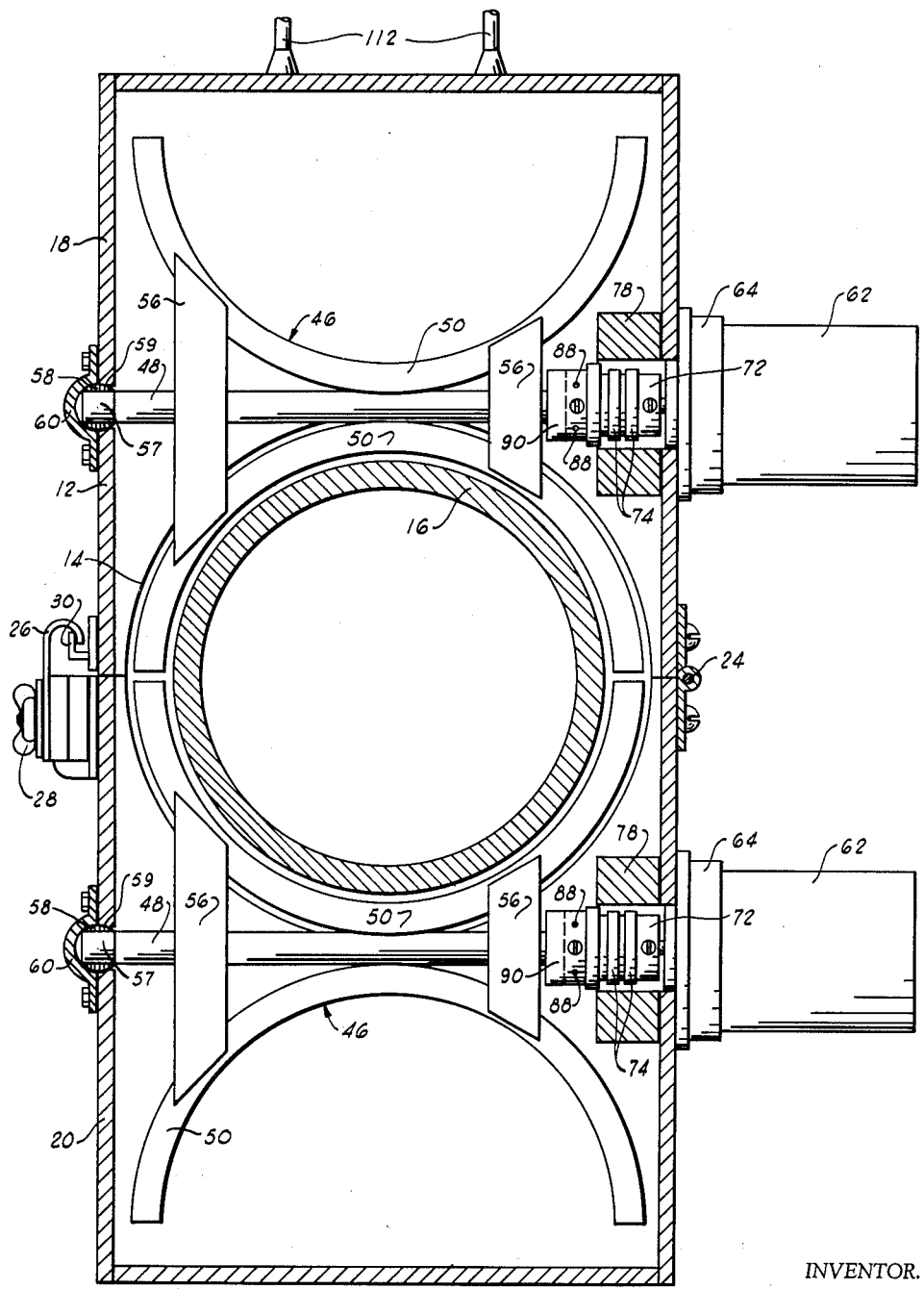
Figure 2 is a vertical sectional view taken transversely through about the center of the apparatus illustrated in Fig. 1.

The pins 88 and cooperating sockets 93 facilitate replacement of the paddles 46 in the housing 12. As previously indicated, the bearing members 58 and cooperating sockets permit an upward or downward swinging movement of the shafts 48 and paddle members 46. Therefore, when it is desired to remove one of the paddles 46 from the housing 12, the paddle 46 is turned until the head of the screw 95 is exposed to the center of the housing. The pins 88 then extend from the projection 86 in the direction which the paddle may be swung in the housing for removal. For example, when the screw 95 is removed, the shaft 48 shown in Fig. 3 may be pivoted counter-clockwise about the extension 57 for disconnection of the head 90 from the head 72. The head 90 will simply be slipped off of the projection 86 of the head 72 and the sockets 93 will be slipped off of the pins 88. Thus the pins 88 and sockets 93 form convenient electrical connectors for connecting the leads 94 to the slip rings 74. It will be be understood that each ring 78 is secured to the side wall of the housing 12 outwardly of the respective head member 90, as illustrated in Fig. 2, to permit swinging movement of the shaft 48.

Figure 6:
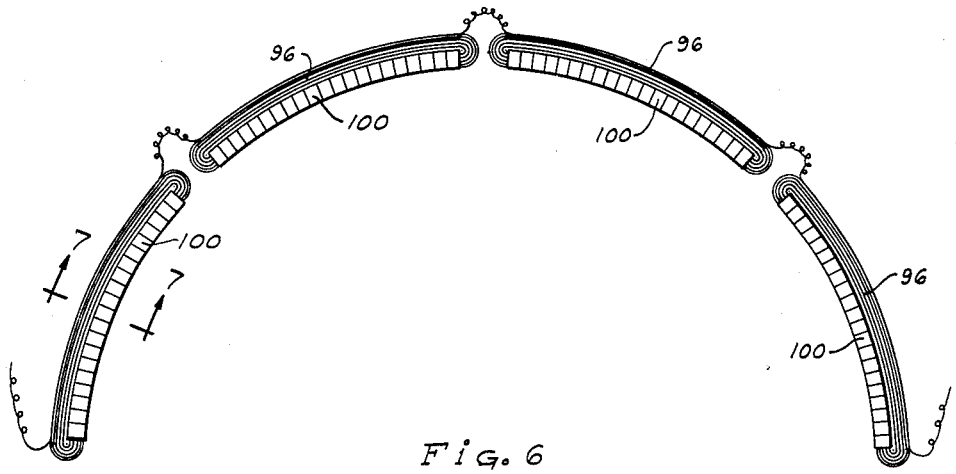
Figure 6 is an elevational view illustrating a typical arrangement and interconnection of a series of pick-up coils.
Figure 7:
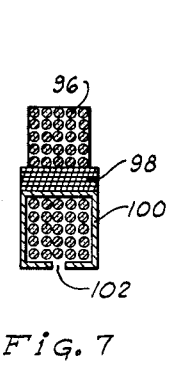
Figure 7 is a sectional view of a typical pick-up coil, as taken along line 7—7 of Fig. 6.

The preferred pick-up coil construction is illustrated in Figs. 6 and 7. Each pick-up coil 96 is wound substantially in the form of a paper clip, that is, one diameter of the coil is substantially longer than the diameter at right angles to the long diameter, and each coil is curved along its longest dimension in conformity with the curvature of the coil holders 50 of the paddle members 46. Also, each coil 96 is preferably provided with a suitable laminated core 98, as illustrated in Fig. 7, to increase the induction of current in the coils when the coils are moved through a magnetic field. Each coil 96 is also preferably provided with a plurality of pole pieces 100 substantially in the form of rectangularly shaped clips extending around the inner reach of the respective coil. A plurality of the pole pieces 100 are provided on each coil 96 to facilitate the transverse curvature of the coil assembly. In other words, a single elongated pole piece 100 could be provided for each coil 96, but since the coils 96 are curved, a plurality of smaller pole pieces 100 are provided in end-to-end relation to facilitate the manufacture of the coils. It will also be noted that each pole piece 100 has an air gap 102 therein which is positioned on the side of the respective coil assembly which comes nearest the pipe being inspected and extends lengthwise along the respective coil.

As previously indicated, a series of the pick-up coils 96 are secured in each of the coil holders 50, with a typical pick-up coil assembly for one of the holders 50 being illustrated in Fig. 6. Any desired number of the pick-up coils 96 may be provided in each coil holder 50, as long as the pick-up coils 96 are arranged to substantially fill the respective holder 50 and effectively encircle about one-half the circumference the pipe 16 being inspected. When the coils 96 are assembled in the coil holders 50, it will be observed that the pole pieces 100 are positioned adjacent the base 52 of the respective channel-shaped coil holder 50 to be moved into proximity with the pipe 16 during rotation of the respective paddle members 46. It will also be noted that the air gaps 102 will extend transversely with respect to the longitudinal axis of the pipe 16, or the path of movement of the apparatus 10. Also, the center line of each coil 96 will extend transversely with respect to the respective supporting shaft 48, such that each coil 96 will cut the maximum number of lines of force during a single rotation of the respective paddle 46.

The wiring of the various electrical components of the preferred apparatus 10 is illustrated in Fig. 8. It will be observed that a single source of D.C. power is required to operate the magnetizing coils 34 and the motors 62. The magnetizing coils 34 are connected in parallel in such a manner that the magnetic field produced at the adjacent ends of the coils 34 will be of opposite polarity. In other words, the left end of the coil 34 to the right of the pick-up coils 96 may produce the north pole of a magnetic field, and the right end of the coil 34 to the left of the pick-up coils 96 may produce the south pole of a magnetic field. Therefore, the pipe 16 will be uniformly saturated in the area of the pick-up coils 96, and any flaw in the pipe 16 between the magnetizing coils 34 will produce a significant variation in the magnetic field surrounding the pipe 16.

The current supply is also connected in parallel through the paddle motors 62 for rotation of the paddles 46 simultaneously with the magnetization of the pipe 16. The various connections between the coils 34 and the motors 62 may be made by plug-in type connections, as illustrated in Fig. 1. The speed of the motors 62 may be controlled as desired, so long as the pick-up coils 96 are moved toward and away from the pipe 16 at a substantially greater speed than the linear speed of the apparatus 10 along the pipe 16. For example, the motors 62 may be operated at 7,000 r.p.m. when the apparatus 10 is moved along the pipe 16 by the operator merely walking alongside the pipe.

The pick-up coils 96 in each coil holder 50 of each paddle 46 are connected in series, but with adjacent coils being wound in opposite directions. Therefore, as long as each adjacent pair of coils 96 are cutting the same member of magnetic lines of force per unit of time, the current induced in one coil will be cancelled out by the current induced in the adjacent coil and no resultant current will be produced. It is therefore also desirable that an even number of coils 96 be provided in each coil holder 50. The end coils 96 in each side of each paddle member 46 remote from the motor 62 are connected in series, such that all of the coils 96 in each paddle member 46 are connected in series. The opposite end coils 96 of the respective paddle member 46 are connected to the slip rings 74 on the shaft 48 of the respective paddle 46 by use of the pin and socket connectors as previously described in connection with Figs. 3, 3A and 3B. Thus, any current generated by the pick-up coils 96 will be transmitted to the slip rings 74, with the current generated by the upper pick-up coils 96 being fed to the upper slip rings 74, and the current generated by the lower pick-up coils 96 being fed to the lower slip rings 74.

Each pair of slip rings 74 are connected through the brushes 76 (not shown in Fig. 8) to a suitable mixer and rectifier circuit 104. The circuit 104 receives the signals generated by all of the pick-up coils 96 and mixes and rectifies these signals in a well known manner and feeds a resulting variable amplitude D.C. signal to a suitable filtering circuit 106. The filter 106 is preferably to the band pass type to filter out that portion of the signal coming from the circuit 104 which is produced by reason of the rotation of the pick-up coils 96, and pass the signal resulting from a change in the magnetic field around the pipe 16 produced by a flaw. As will be apparent, the pickup coils 96 will produce a high frequency signal when moving through a uniform magnetic field, the frequency of which will be governed by the speed of rotation of the paddles 46. This high frequency signal may be considered as a carrier. When the coils 96 are moved through a varying magnetic field, a substantially different, and, incidentally, stronger signal will be produced, which may be considered as a modulating signal. The filter 106 may be easily designed to filter out such carrier and pass such modulator. However, the filter 106 will pass a small portion of the carrier and the output of the filter will vary to a slight degree even when the magnetic field is uniform along the pipe. Therefore, the output of the filter 106 will increase in amplitude when the pick-up coils are moved over a stressed area, even though the area extends a substantial distance around the pipe. This last-mentioned output will change gradually, as compared with the output when the pick-up coils pass a crack or the like, such that the two types of flaws may be readily differentiated on the resulting log, as will be hereinafter set forth.

Figure 9:
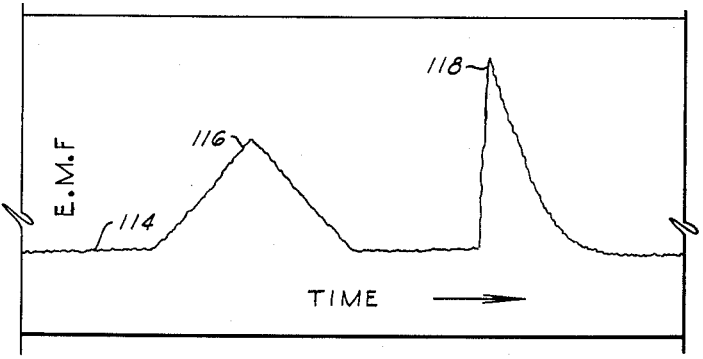
Figure 9 is a schematic plan view of a log which may result from use of the present apparatus.

The useful signal passed by the filter 106 is amplified by a suitable amplifier 108 and fed to a suitable pen type recorder 110, which preferably produces a log of the type schematically illustrated in Fig. 9. As it will be well understood by the art, the circuits 104, 106, 108 and the recorder 110 are suitably designed to conform to the currents generated by the pick-up coils 96, and are preferably assembled in a truck or the like for convenient movement from one location to another. The circuit 104 through 110 may be easily connected to the portion of the apparatus 10 mounted on the pipe 16 by suitable plug-in type conductors, such that the mixing, filtering, amplifying and recording equipment need not be removed from the transporting truck when a series of pipe sections are being inspected.

*Operation*

The present apparatus is particularly useful in the oil industry for examining drill pipe and the like in the field at oil well locations, as when the pipe has been pulled out of the well during a well drilling or producing operation, or before beginning the drilling of a new well. The apparatus 10 is transported to the location where the pipe is to be inspected, then the housing 12, with the magnetizing coils 34 thereon, is mounted on a joint of the pipe 16 to be inspected in the manner illustrated in Fig. 1. When the pipe to be inspected has large collars, boxes or the like (not shown) on the ends thereof, as, for example, drill pipe, the housing 12 is opened on the hinge 24 and placed around an intermediate portion of the pipe. The magnetizing coils 34, having a large inner diameter, are slipped over the ends of the pipe and placed on the arms 32 in the positions shown in Fig. 1.

The pipe 16 is preferably supported at its opposite ends above ground level, such that the housing 12 will be elevated at a convenient height where it can be moved manually along the pipe 16. The magnetizing coils 34 and motors 62 are then connected to a source of power supply in the transporting vehicle, and the brushes 76 are connected to the mixing, filtering, amplifying and recording equipment which is also mounted in the transporting vehicle.

With the source of D.C. power energized, the magnetizing coils 34 will saturate the portion of the pipe 16 between the two coils, and the motors 62 will start operating to rotate the paddle members 46 above and below the pipe 16 between the magnetizing coils 34. The mixing, filtering, amplifying and recording equipment, 104 through 110, is then receiving signals from the brushes 76; whereupon the operator grips suitable handles 112 provided on the top of the housing 12 and moves the housing 12 and magnetizing coils 34 lengthwise along the pipe 16.

During the movement of the housing 12 along the pipe 16, the magnetizing coils 34, as previously stated, provide a substantial saturation of that portion of the pipe 16 over which the housing 12 is being moved, throughout the movement of the housing 12 along the length of the pipe 16. Simultaneously, the motors 62 turn the paddle members 46 to rotate the pick-up coils toward and away from the periphery of the pipe 16. As will be apparent, each side of each paddle member 46 encircles about one-half of the circumference of the pipe 16 once during each revolution of the respective paddle, whereby each pick-up coil 96 is moved toward and away from the pipe during each revolution of the respective paddle 46, to cut the maximum number of lines of force in the magnetic field surrounding the pipe 16 in the vicinity of the housing 12. It will also be noted that each coil 96 is arranged in such a manner that pole pieces 100 thereof will pass through the maximum number of lines of force and induce a current in the respective pick-up coil 96. The air gaps 102 inhance the induction of the maximum current in the pick-up coils 96. It may also be noted, however, that the pick-up coils 96 could be used without the cores 98 and pole pieces 100 and current would be induced in each pick-up coil when the coil cuts the lines of force surrounding the pipe 16. However, the cores 98 and pole pieces 100 inhance the induction of current in the pick-up coils 96 and provide a more responsive apparatus.

The signals produced by the pick-up coils carried by the two paddle members 46 are, as previously described, fed to the mixing and rectifying circuit 104 to produce a single variable amplitude D.C. signal indicative of the resultant of the signals generated by all of the pick-up coils 96. The pick-up coils 96 provide a generator action, whereby each coil produces a current when passed through the magnetic field surrounding the pipe 16. However, as long as the magnetic field around the entire circumference of the pipe 16 is substantially uniform, the oppositely wound pick-up coils 96 will produce a minimum total signal. When a flaw is present in the pipe 16 in the area over which only a small number (usually one) of the pick-up coils 96 is moved, the magnetic field at this point, as previously described, will be non-uniform and will produce a current in the respective pick-up coil substantially different from the signals produced from the remaining pick-up coils in the assembly; whereupon a substantially different type of signal is fed to the mixing and rectifying circuit 104.

At this point it may be noted that substantially all cracks appearing in pipe extend only partially around the pipe, whereby only a portion of the pick-up coils 96 will be moved over the crack as the apparatus is moved along the pipe. In other words, a crack very seldom extends any substantial distance transverse to the longitudinal axis of the pipe 16 where it would be opposite the path of movement of two adjacent coils 96 and the effects thereof be dampened by the opposed connection of the coils 96. However, a crack will extend some distance around the pipe to produce opposite magnetic poles and distort the magnetic field around the pipe. Also, a pipe is very seldom, if ever, pitted uniformly around its entire circumference.

The signals mixed by the circuit 104 are in turn filtered by the filter 106, as previously described, and then amplified by the amplifier 108 and fed to the recorder 110. The log shown in Fig. 9 schematically illustrates the operation of the recorder 110 when two different types of flaws are present in the pipe 16 being inspected. As will be observed at the left hand end of the log shown in Fig. 9, the line 114 produced by the recorder 110 will ordinarily move in a substantially horizontal direction, with very small waves in the line 114. The first significant variation 116 in the line 114 is representative of the response of a typical recorder 110 when the housing 12 is moved over a stressed area in the pipe 16 being inspected. It will be observed that the variation 116 slopes upwardly and downwardly to and from its peak at a fairly gradual rate, indicating that the variation in molecular structure in the pipe 16 which produced the signal 116 extended over a substantial length of the pipe 16. As previously indicated, this type of response ordinarily indicates that the pick-up coils 96 have moved over a portion of the pipe 16 which has been stressed.

The second variation or wave 118 shown on the log of Fig. 9 is typical of a response of the recorder 110 when the pick-up coils 96 are moved over a substantial variation in the wall thickness of the pipe 16, as when the pipe 16 is cracked or rather severely pitted. It will be observed that the wave 118 is sharp, or peaked, as compared with the wave 116, indicating that an abrupt change occurred in the molecular structure of the pipe 16.

As indicated in Fig. 9, the length of the log is correlated with the time of operation of the recorder 110. As a result, the length of the log may be correlated with the length of the pipe 16 being inspected, such that the variations or signals on the log, as indicated at 116 and 118, may be precisely located on the pipe 16. In view of this time and distance correlation, the housing 12 should be moved along the pipe 16 at a uniform speed. However, I have found that when the housing 12 is moved along the pipe 16 by the operator merely gripping the handles 112 and walking alongside of the pipe 16, the signals produced on the log may be accurately correlated with the length of the pipe 16, and the flaws accurately located on the pipe. It may also be noted that since the pick-up coils 96 are moved through the magnetic field surrounding the pipe 16 at a much greater speed than the movement of the housing 12 along the pipe 16, the signals produced by variation in the magnetic field will be substantially magnified and easily located on the log produced by the recorder 110. Furthermore, since these coils 96 are rotated at high speed, the housing 12 may be moved at any desired speed along the pipe 16 and an interpretable log will be produced.

As previously indicated, when the apparatus 10 is used on a different sized pipe, the rollers 36 are adjusted with respect to arms 32 to position the apertures 14 in the opposite ends of the housing 12 concentrically around the pipe to be inspected, as well as positioning the magnetizing coils 34 concentrically around the pipe to be inspected. In addition to adjusting the rollers 36, I prefer to provide various sizes of paddle members 46 for the various sizes of pipes to be inspected. The paddles 46 may be easily removed by first removing the housing 12 from the pipe 16 and then opening the housing 12 by unfastening the member 26 from the member 30 and swinging the upper section 18 of the housing on the hinge 24. Each paddle member 46 is then positioned or turned such that the respective dowel pins 88 are extending toward the center of the housing 12. The respective paddle 46 is then pivoted with its bearing member 58 to disconnect the head 90 from the head 72 and disconnect the paddle member from the respective motor 62. The end 57 of the respective shaft 48 may then be withdrawn from the respective bearing member 58, and the entire paddle member 46 removed from the housing 12. A correctly sized paddle member 46 is then installed in the reverse manner, and the housing 12 can be reassembled on a pipe in the manner previously described.

From the foregoing it will be apparent that the present invention provides an apparatus for precisely locating flaws of various types occurring in ferromagnetic specimens. The apparatus is particularly useful for inspecting pipe in the field, where the apparatus may be manually moved along a joint of pipe in a minimum of time and with a minimum of effort on behalf of the operator. The rotating pick-up coils provide the generation of a maximum current in the recording circuit when the apparatus is moved over a flaw in the specimen being scanned. Also, the rotation of the pick-up coils at a speed substantially greater than the linear speed of the entire apparatus permits the movement of the apparatus along a pipe or the like at any desired speed; that is, the linear speed of the entire apparatus does not control the strength of the signal produced when the pick-up coils are moved over a flaw in the specimen. It will also be apparent that the present apparatus is simple in construction, may be used on various sizes of specimens, will have a long service life, and may be economically manufactured.

Changes may be made in the combination and arrangement of parts or elements as heretofore set forth in the specification and shown in the drawings, it being understood that changes may be made in the precise embodiment shown without departing from the spirit and scope of the invention as defined in the following claims.

I claim:
1. In an apparatus for detecting flaws in ferromagnetic pipe and the like, housing means surrounding the pipe, means supporting the housing means on the pipe for relative movement of the pipe lengthwise through the housing means, magnetizing means carried by the housing means for magnetizing the pipe in the area of the housing means, flux detecting means rotatably supported in the housing means circumferentially around the pipe on axes extending at right angles to the longitudinal axis of the pipe, and means for rotating each detecting means about its respective axis, each of said detecting means comprising paper clip shaped coil means curved along its longest dimension on the arc of a circle having a radius slightly larger than the radius of the pipe and arranged to partially encircle the pipe during only a portion of the rotation of the respective detecting means.

2. The combination defined in claim 1 characterized further in that two detecting means are provided in the housing means on opposite sides of the pipe, and each detecting means includes at least two paper clip shaped pick-up coils curved along their longest dimensions on the arc of a circle having a radius slightly larger than the radius of the pipe and arranged in end-to-end relation in positions to partially encircle the pipe during a portion of the rotation of the respective detecting means, said coils being of a combined length to encircle about one-half the periphery of the pipe, and being connected in opposing relation.

3. The combination defined in claim 1 characterized further in that two detecting means are provided in the housing means, and each detecting means comprises a shaft journaled at its opposite ends to the housing means and extending at a right angle to the longitudinal axis of the pipe, a pair of elongated coil holders secured on opposite sides of the shaft extending lengthwise along the shaft, each of said holders being curved along its length on a radius slightly larger than the radius of the pipe and having a length slightly less than one-half the circumference of the pipe, said holders being arranged to alternately encircle about one-half of the pipe once during each revolution of the respective shaft, a plurality of pick-up coils carried by each holder, each pick-up coil being wound in the shape of a paper clip and curved along its longest dimension in conformity with the curvature of the respective holder, the coils in each holder being connected in series in alternately opposing senses, and a conductor connecting the coil in one end of one holder to the end coil in the adjacent end of the other holder.

4. The combination defined in claim 3 characterized further in that each pick-up coil is secured in the respective holder with one side of the coil in a position to approach the surface of the pipe closer than the other side of the coil, a laminated core in each pick-up coil, and a plurality of pole pieces extending around said one side of each coil, each of said pole pieces having an air gap therein extending transversely with respect to the path of movement of the respective pole pieces.

5. An apparatus for detecting flaws in ferromagnetic pipe and the like, comprising a hollow housing having aligned apertures in the opposite ends thereof of a size to loosely receive the pipe, said housing being formed by an upper section and a lower section terminating at about the centers of said apertures and hinged together at one side of the housing for assembling the housing around an intermediate portion of the pipe, an arm extending outwardly from each end of the upper section of the housing above the respective aperture, circumferentially spaced rollers adjustably secured to each arm for supporting the housing on the pipe and moving the housing along the pipe, a magnetizing coil secured on each arm in a position to extend loosely around a pipe extending through the housing, flux detecting means rotatably supported in the upper and lower sections of the housing, a recorder connected to the detecting means, a motor carried by each of the sections of the housing for rotating the respective detecting means, and a source of electrical energy connected to the magnetizing coils and motors, each of said detecting means comprising a paddle-shaped member journaled at its opposite ends to the opposite sides of the respective housing section, the side edges of each paddle being curved in a concave direction with respect to the paddle on the arc of a circle having a radius slightly larger than the radius of the pipe being inspected to alternately partially encircle a pipe extending through the housing during the rotation of the respective paddle, and a plurality of pick-up coils carried in the curved edge portions of each paddle to cut magnetic lines of force around the pipe between the magnetizing coils.

6. Apparatus as defined in claim 5 characterized further in that said magnetizing coils are connected with their magnetic polarities in opposing relation, the pick-up coils in each side of each paddle are connected in series in opposing relation, and a conductor connects the coil at one end of one side of each paddle to the adjacent end coil of the other side of the respective paddle.

7. Apparatus as defined in claim 6 characterized further in that a pair of slip rings are carried by each paddle, the coils at the opposite ends of each paddle are connected to the respective slip rings, a mixing and rectifying circuit connected to the slip rings, and a band pass filter connected to the rectifying circuit, said recorder being connected to the band pass filter.

References Cited in the file of this patent

UNITED STATES PATENTS

| Re. 15,859 | Burrows | June 17, 1924 |
| Re. 18,555 | Sperry | Aug. 2, 1932 |
| 1,954,975 | Zuschlag | Apr. 17, 1934 |
| 2,150,922 | Hay | Mar. 21, 1939 |
| 2,382,743 | Penther et al. | Aug. 14, 1945 |
| 2,650,344 | Lloyd | Aug. 25, 1953 |
| 2,685,672 | Price et al. | Aug. 3, 1954 |
| 2,719,950 | Cooley et al. | Oct. 4, 1955 |